(12) United States Patent
Tanaka et al.

(10) Patent No.: US 9,718,490 B2
(45) Date of Patent: Aug. 1, 2017

(54) STEERING SYSTEM

(71) Applicant: JTEKT CORPORATION, Osaka-shi, Osaka (JP)

(72) Inventors: Hidenobu Tanaka, Shiki-gun (JP); Hiromitsu Tomiyama, Kashihara (JP); Masayuki Nagaoka, Kashiba (JP); Kenichi Aota, Nara (JP)

(73) Assignee: JTEKT CORPORATION, Osaka-Shi (JP)

( * ) Notice: Subject to any disclaimer, the term of this patent is extended or adjusted under 35 U.S.C. 154(b) by 0 days.

(21) Appl. No.: 15/200,692

(22) Filed: Jul. 1, 2016

(65) Prior Publication Data

US 2017/0008548 A1    Jan. 12, 2017

(30) Foreign Application Priority Data

Jul. 8, 2015   (JP) ................................. 2015-137044

(51) Int. Cl.
 *B62D 1/184*   (2006.01)
(52) U.S. Cl.
 CPC ................................... *B62D 1/184* (2013.01)
(58) Field of Classification Search
 CPC .................................................... B62D 1/184
 See application file for complete search history.

(56) References Cited

U.S. PATENT DOCUMENTS

| | | | | |
|---|---|---|---|---|
| 6,659,504 | B2 * | 12/2003 | Riefe ..................... | B62D 1/195 |
| | | | | 280/775 |
| 8,505,408 | B2 * | 8/2013 | Havlicek ................ | B62D 1/184 |
| | | | | 280/775 |
| 8,827,311 | B2 * | 9/2014 | Schnitzer ............... | B62D 1/184 |
| | | | | 188/371 |
| 8,881,618 | B2 * | 11/2014 | Buzzard ................. | B62D 1/184 |
| | | | | 280/775 |
| 9,156,491 | B2 * | 10/2015 | Okano .................... | B62D 1/187 |
| 9,469,330 | B2 * | 10/2016 | Tanaka ................... | B62D 1/184 |
| 9,604,663 | B2 * | 3/2017 | Tomiyama ............. | B62D 1/187 |
| 2004/0261565 | A1 * | 12/2004 | Uphaus .................. | B62D 1/184 |
| | | | | 74/493 |
| 2009/0013817 | A1 | 1/2009 | Schnitzer et al. | |
| 2016/0144886 | A1 * | 5/2016 | Tomiyama ............. | B62D 1/187 |
| | | | | 74/493 |

(Continued)

OTHER PUBLICATIONS

Apr. 18, 2017 Search Report issued in European Patent Application No. 16177970.7.

*Primary Examiner* — Drew J Brown
(74) *Attorney, Agent, or Firm* — Oliff PLC

(57) ABSTRACT

A steering system includes: a first tooth member provided with a first tooth row that includes a plurality of first teeth each of which has a tooth trace extending in a lateral direction and which are aligned along a tilt direction, the first tooth row being elastically deformable in the lateral direction, and a second tooth member including a second tooth row that includes a plurality of second teeth each of which has a tooth trace extending in the lateral direction and which are aligned along the tilt direction, the second tooth member facing the first tooth member in the lateral direction. The first tooth member is supported by an upper bracket such that the first tooth row is disposed away from the upper bracket in the lateral direction. The second tooth member is movable in the tilt direction along with a column jacket.

5 Claims, 12 Drawing Sheets

(56) References Cited

U.S. PATENT DOCUMENTS

2017/0008546 A1\* 1/2017 Tanaka ................... B62D 1/184
2017/0008547 A1\* 1/2017 Tomiyama ............. B62D 1/184
2017/0008549 A1\* 1/2017 Tomiyama ............. B62D 1/187

\* cited by examiner

STEERING SYSTEM

INCORPORATION BY REFERENCE

The disclosure of Japanese Patent Application No. 2015-137044 filed on Jul. 8, 2015, including the specification, drawings and abstract, is incorporated herein by reference in its entirety.

BACKGROUND OF THE INVENTION

1. Field of the Invention

The invention relates to a steering system.

2. Description of the Related Art

A steering column described in U.S. Patent Application No. 2009/0013817 (US 2009/0013817 A) includes an adjustment portion and a holding portion. The adjustment portion can adjust the position of the steering column. The holding portion does not move in an adjustment direction for the steering column in accordance with the positional adjustment of the steering column. The holding portion is provided with tooth portions disposed in the adjustment direction. A tooth plate that is an elastic body is penetrated by a clamp bolt that penetrates the adjustment portion and the holding portion. The tooth plate has tooth portions aligned in the adjustment direction.

Operating an operation member attached to the clamp bolt enables a pressing member through which the clamp bolt is inserted to be moved toward the holding portion. Moving the pressing member toward the holding portion allows the tooth plate to be pressed by the pressing member and moved toward the holding portion. At that time, the tooth portions of the tooth plate move into spaces between the tooth portions of the holding portion and mesh with the tooth portions of the tooth plate.

If the tooth portions of the tooth plate ride onto the tooth portions of the holding portion without moving into the spaces between the tooth portions of the holding portion, the pressing member presses the holding portion by deflecting the tooth plate. When a secondary collision causes the deflected tooth plate to move in the adjustment direction, the tooth plate returns to an original state in which the tooth plate is not deflected, and the tooth portions of the tooth plate move into the spaces between the tooth portions of the holding portion. Consequently, the tooth portions of the holding portion mesh with the tooth portions of the tooth plate.

In the steering column in US 2009/0013817 A, when a secondary collision occurs, the steering column acts to move in the adjustment direction with the tooth portions of the holding portion meshed with the tooth portions of the tooth plate, which is an example of a tooth member that moves in accordance with an operation of the operation member. Consequently, the tooth portions of the tooth plate are subjected to a force that acts in the adjustment direction from the tooth portions of the holding portion. Thus, the strength (shear strength) of the tooth portions of the tooth plate needs to be set so as to withstand shearing resulting from the force applied by the holding portion. However, since this tooth member is an elastic body, selection of a material for the tooth member is limited. This precludes an increase in the degree of freedom of design of the tooth member.

SUMMARY OF THE INVENTION

An object of the invention is to provide a steering system that allows free selection of a material for a tooth member that moves in accordance with an operation of an operation member.

According to an aspect of the invention, a steering system includes: a steering shaft with a steering member coupled to the steering shaft at one end thereof; a column jacket that holds the steering shaft and that is movable in a tilt direction extending upward and downward so as to cross an axial direction of the steering shaft; a bracket fixed to a vehicle body to support the column jacket; an operation member that is operated to enable and disable movement of the column jacket with respect to the bracket; a first tooth member provided with a first tooth row that includes a plurality of first teeth each of which has a tooth trace extending in an orthogonal direction orthogonal to both the axial direction and the tilt direction and which are aligned along the tilt direction, the first tooth row being elastically deformable in the orthogonal direction, the first tooth member being supported by the bracket such that the first tooth row is disposed away from the bracket in the orthogonal direction; and a second tooth member including a second tooth row that includes a plurality of second teeth each of which has a tooth trace extending in the orthogonal direction and which are aligned along the tilt direction, the second tooth member facing the first tooth member in the orthogonal direction, being movable in the tilt direction along with the column jacket, and also being movable in the orthogonal direction in accordance with an operation of the operation member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
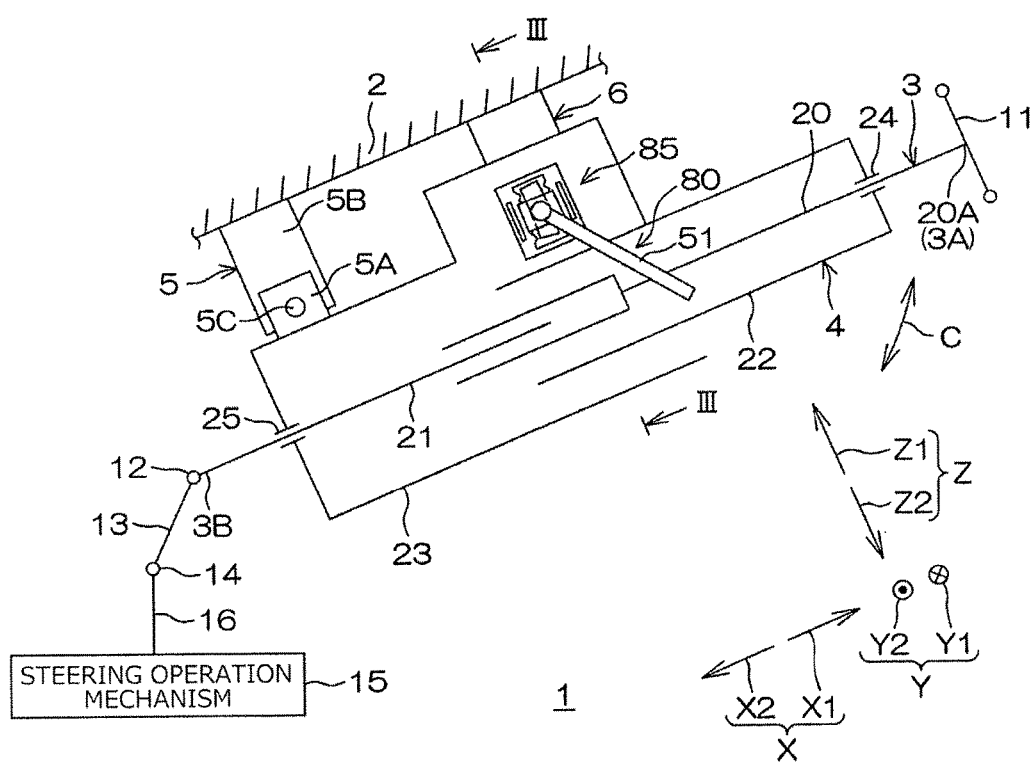
FIG. 1 is a side view schematically depicting a configuration of a steering system in an embodiment of the invention.

An embodiment of the invention will be described below in detail with reference to the attached drawings. FIG. 1 is a side view schematically depicting a configuration of a steering system 1 according to the embodiment of the invention. In FIG. 1, a left side of the drawing plane corresponds to a front side of a vehicle body 2 to which the steering system 1 is attached, a right side of the drawing plane corresponds to a rear side of the vehicle body 2, an upper side of the drawing plane corresponds to an upper side of the vehicle body 2, and a lower side of the drawing plane corresponds to a lower side of the vehicle body 2.

As seen in FIG. 1, the steering system 1 includes, as main components, a steering shaft 3, a column jacket 4, a lower bracket 5, and an upper bracket 6 (bracket). A steering member 11 is coupled to an end 3A of the steering shaft 3, which is a rear end. The other end 3B of the steering shaft 3, which is a front end, is coupled to a pinion shaft 16 of a steering operation mechanism 15 via a universal joint 12, an intermediate shaft 13, and a universal joint 14 in this order.

The steering operation mechanism 15 includes a rack-and-pinion mechanism. The steering operation mechanism 15 steers steered wheels such as tires not depicted in the drawings, in accordance with rotation of the steering shaft 3 transmitted to the steering operation mechanism 15. The steering shaft 3 extends in a front-rear direction of the vehicle body 2. A direction in which the steering shaft 3 extends is hereinafter referred to as an axial direction X. The axial direction X is inclined to a horizontal direction such that the other end 3B located lower than the end 3A. A rear side in the axial direction X is denoted by reference character "X1". A front side in the axial direction X is denoted by reference character "X2".

A direction orthogonal to the axial direction X and perpendicular to the drawing sheet of FIG. 1 is referred to as a lateral direction Y (orthogonal direction). A direction that is orthogonal to the axial direction X and that extends substantially in an up-down direction in FIG. 1 is referred as an up-down direction Z. In the lateral direction Y, a side facing away from the viewer in the sheet of FIG. 1 is a right side Y1, and a side facing the viewer in FIG. 1 is a left side Y2. In the up-down direction Z, an upper side is denoted by reference character "Z1", and a lower side is denoted by reference character "Z2". In the figures other than FIG. 1, directions that correspond to the following directions are denoted by the same reference characters as those in FIG. 1: the axial direction X, the rear side X1, the front side X2, the lateral direction Y, the right side Y1, the left side Y2, the up-down direction Z, the upper side Z1, and the lower side Z2.

The steering shaft 3 includes an upper shaft 20 that is cylindrical at least at a part of the front side X2 of the upper shaft and a columnar lower shaft 21. The upper shaft 20 is disposed on the rear side X1 with respect to the lower shaft 21 and coaxially with the lower shaft 21. A rear end 20A of the upper shaft 20 is the end 3A of the steering shaft 3. A rear end of the lower shaft 21 is inserted into a front end of the upper shaft 20 from the front side X2. The lower shaft 21 is fitted into the upper shaft 20 by spline fitting or serration fitting. Thus, the upper shaft 20 and the lower shaft 21 are integrally rotatable and movable relative to each other along the axial direction X. The steering shaft 3 can be extended and contracted in the axial direction X by moving the upper shaft 20 with respect to the lower shaft 21 in the axial direction X.

The column jacket 4 is generally a hollow member extending in the axial direction X. The column jacket 4 houses the steering shaft 3. The column jacket 4 has an upper jacket 22 and a lower jacket 23 that extend in the axial direction X. The upper jacket 22 is positioned on the rear side X1 with respect to the lower jacket 23. The lower jacket 23 is externally fitted over the upper jacket 22 from the front side X2. In this state, the upper jacket 22 is movable with respect to the lower jacket 23 in the axial direction X. This movement enables the whole column jacket 4 to be extended and contracted along the axial direction X.

The column jacket 4 is coupled to the steering shaft 3 via a bearing 24 and a bearing 25. Consequently, the column jacket 4 supports the steering shaft 3 so that the steering shaft 3 is rotatable, and holds the steering shaft 3. The column jacket 4 can be extended and contracted along with the steering shaft 3. The extension and contraction of the steering shaft 3 and the column jacket 4 as used herein are referred to as "telescopic" operations. Extension and contraction adjustment, in other words, telescopic positional adjustment of the steering member 11 in the axial direction X, is referred to as telescopic adjustment.

The lower bracket 5 supports a front side X2 portion of the lower jacket 23 to couple the steering system 1 to the vehicle body 2. The lower bracket 5 includes a pair of movable brackets 5A (see also FIG. 2 described below), a fixed bracket 5B, and a central shaft 5C. The movable brackets 5A are fixed to the lower jacket 23. The fixed bracket 5B is fixed to the vehicle body 2. The central shaft 5C extends in the lateral direction Y.

The movable brackets 5A are supported by the fixed bracket 5B so as to be able to pivot via the central shaft 5C. Thus, in conjunction with the steering shaft 3, the column jacket 4 as a whole can pivot upward and downward around the central shaft 5C with respect to the fixed bracket 5B and the upper bracket 6. The pivoting as used herein is referred to as "tilt", and a substantial up-down direction around the central shaft 5C is referred to as a tilt direction C. The tilt direction C extends upward and downward so as to cross the axial direction X. The tilt direction C is orthogonal to the lateral direction Y. The positional adjustment of the steering member 11 based on tilting is referred to as tilt adjustment.

Figure 2:
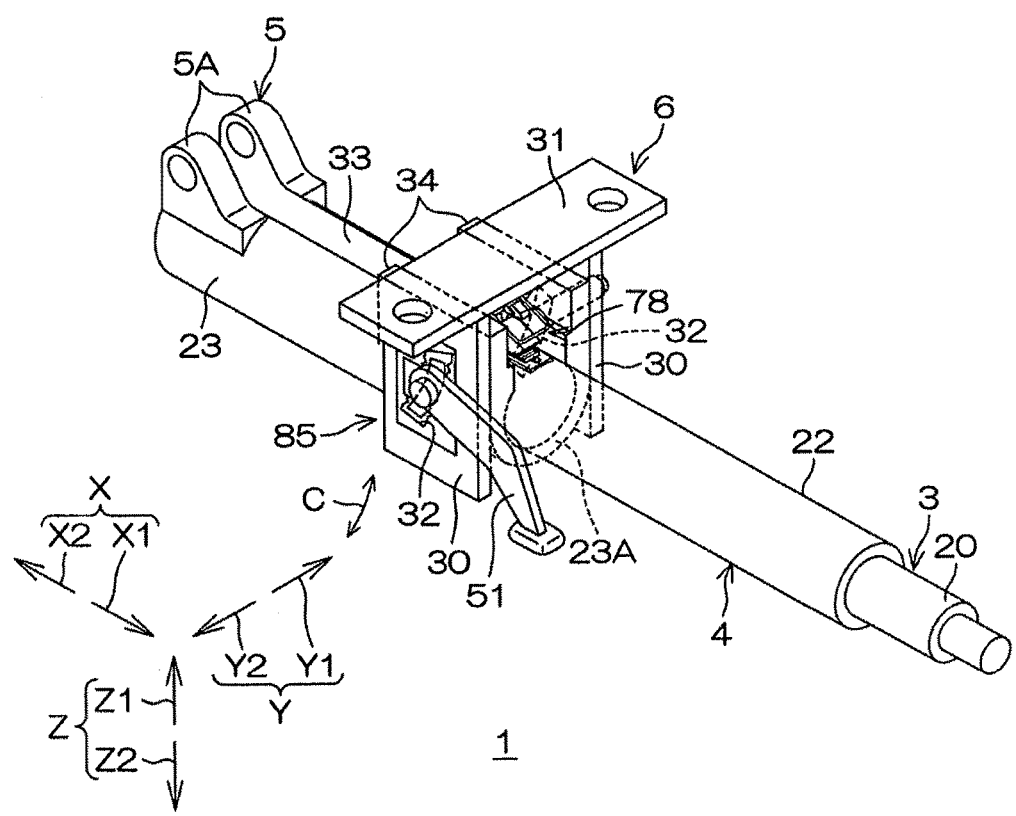
FIG. 2 is a perspective view of the steering system.

The upper bracket 6 supports a rear side X1 portion of the lower jacket 23 of the column jacket 4 to couple the steering system 1 to the vehicle body 2. As seen in FIG. 2 that is a perspective view of the steering system 1, the upper bracket 6 is shaped like a groove that is open downward and is formed laterally symmetrically with respect to the column jacket 4 so as to appear like a general inverted U-shape as viewed in the axial direction X. Specifically, the upper bracket 6 integrally includes a pair of side plates 30 and a coupling plate 31 that is thin in the up-down direction Z. The side plates 30 are thin in the lateral direction Y and opposed to with the column jacket 4 located therebetween. The coupling plate 31 is coupled to an upper end of each of the side plates 30.

In the side plates 30, respective tilt grooves 32 are formed at the same position as viewed in the lateral direction Y. The tilt grooves 32 extend in the tilt direction C. The coupling plate 31 has portions that extend outward beyond the respective side plates 30 in the lateral direction Y. Bolts or the like not depicted in the drawings are inserted through the extending portions of the coupling plate 31 so that the whole upper bracket 6 is fixed to the vehicle body 2 (see FIG. 1).

In an upper side Z1 portion of the lower jacket 23, a slit 33 is formed which extends all along the lower jacket 23 in the axial direction X so as to penetrate the lower jacket 23 in the up-down direction Z. At a rear end 23A of the lower jacket 23, a pair of clamped portions 34 is integrally provided which extends toward the upper side Z1 while defining the slit 33 in the lateral direction Y. Each of the clamped portions 34 is generally a rectangular parallelepiped extending in the axial direction X and the up-down direction Z.

Figure 3:
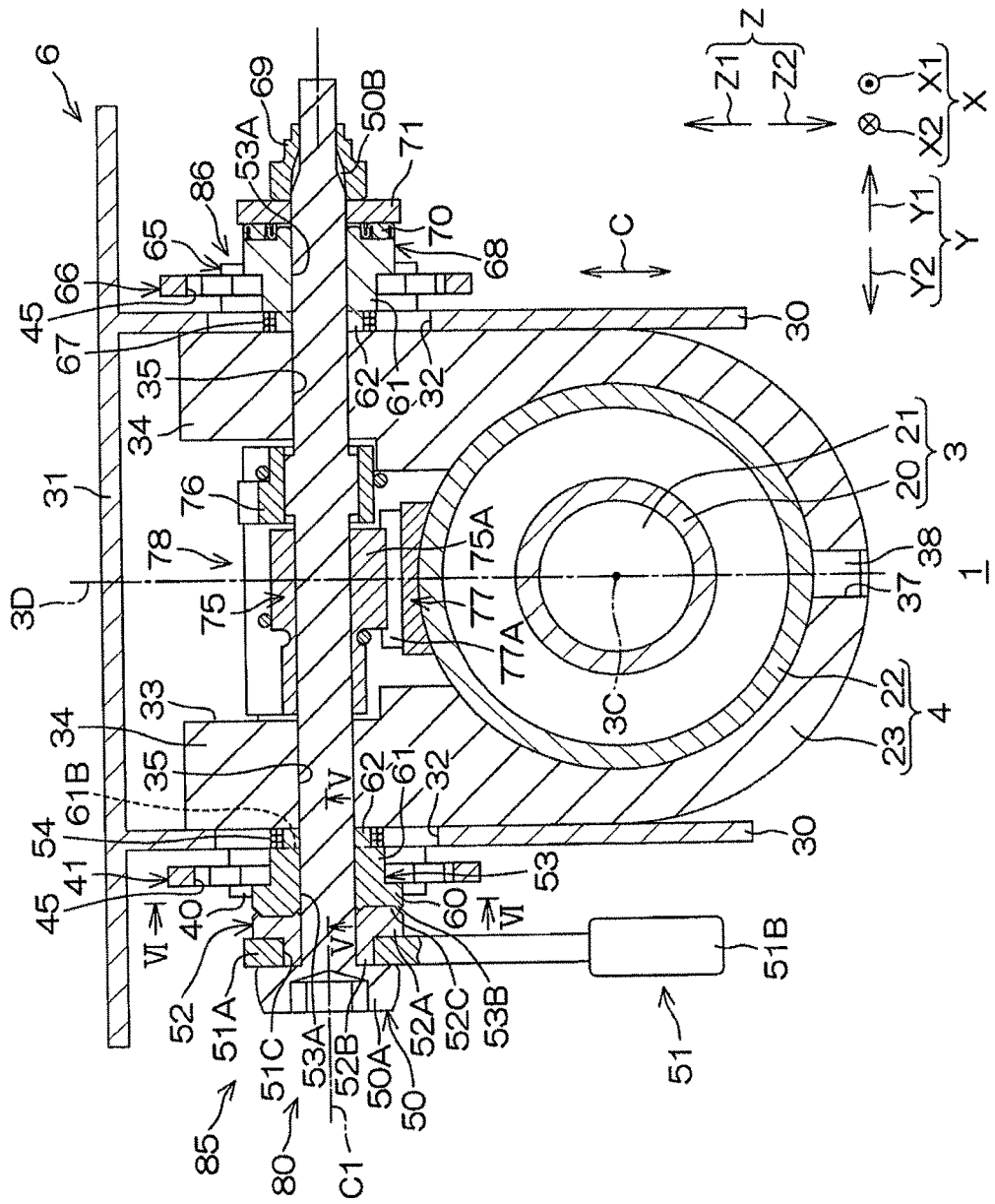
FIG. 3 is a sectional view taken along the line III-III in FIG. 1.

FIG. 3 is a sectional view taken along the line III-III in FIG. 1. In FIG. 3, a plane extending in the up-down direction Z through a central axis 3C of the steering shaft 3 is referred to as a reference plane 3D. As seen in FIG. 3, in each of the clamped portions 34, a shaft insertion hole 35 is formed which penetrates the clamped portion 34 in the lateral direction Y. Each of the shaft insertion holes 35 in the clamped portions 34 overlaps a part of the tilt groove 32 in a corresponding one of the side plates 30 of the upper bracket 6 as viewed in the lateral direction Y.

In a lower side Z2 portion of the lower jacket 23, a guide groove 37 is formed which extends in the axial direction X. A guided protrusion 38 fixed to the upper jacket 22 is inserted through the guide groove 37. The guide groove 37 restricts rotation of the upper jacket 22 with respect to the lower jacket 23 while guiding, via the guided protrusion 38, movement of the upper jacket 22 in the axial direction X. An end (not depicted in the drawings) of the guide groove 37 in the axial direction X comes into abutting contact with the guided protrusion 38 to prevent the upper jacket 22 from slipping out from the lower jacket 23.

Figure 4:
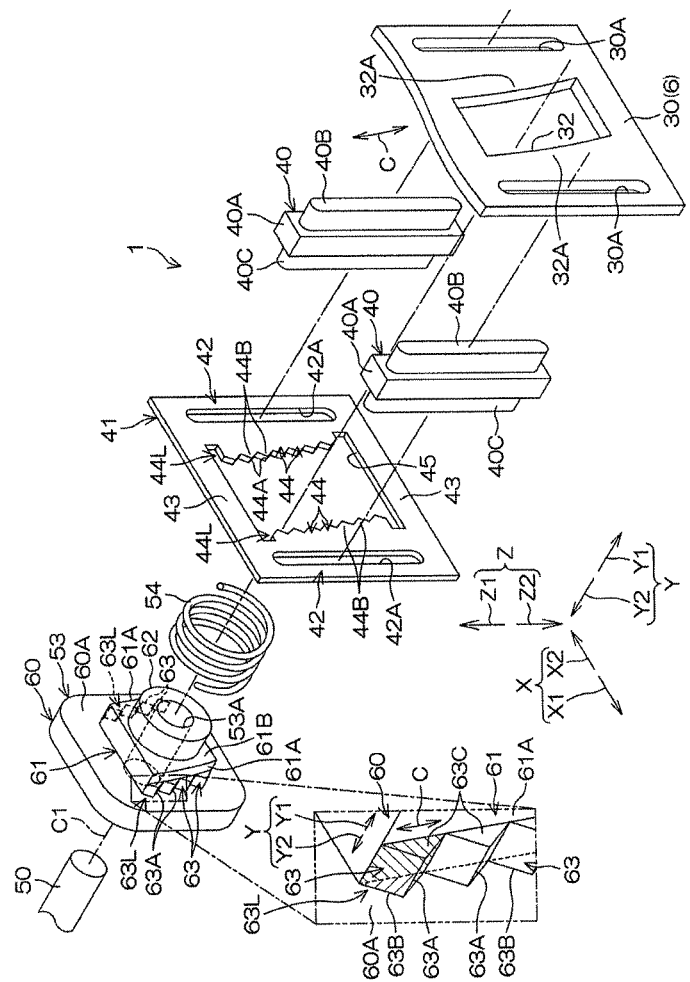
FIG. 4 is an exploded perspective view of members located around a left side plate of an upper bracket.

FIG. 4 is an exploded perspective view of members located around the left-side-Y2 side plate 30 of the upper bracket 6. As seen in FIG. 4, the steering system 1 includes a pair of separation members 40 and a first tooth member 41 that are disposed near the left-side-Y2 side plate 30. The separation members 40 are disposed with a space therebetween in the axial direction X. Each of the separation members 40 integrally includes a generally rectangular interposition portion 40A, a first insertion portion 40B, and a second insertion portion 40C. The interposition portion 40A extends in the up-down direction Z. The first insertion portion 40B protrudes from a right side surface of the interposition portion 40A toward the right side Y1. The second insertion portion 40C protrudes from a left side surface of the interposition portion 40A toward the left side Y2. FIG. 3 depicts only one of the separation members 40.

In connection with the separation members 40, a pair of first support holes 30A extending in the up-down direction Z is formed in the left-side-Y2 side plates 30. The first support holes 30A are located away with the tilt groove 32 interposed therebetween in the axial direction X. The first tooth member 41 is, for example, a metal plate that is elastically deformable in the lateral direction Y. The outer shape of the first tooth member 41 is generally like a quadrangle as viewed in the lateral direction Y. The first tooth member 41 is disposed at the left side Y2 of the left-side-Y2 side plate 30 so as to be separate from the left-side-Y2 side plate 30 (see FIG. 3).

The first tooth member 41 integrally includes a pair of supported portions 42, a pair of coupling portions 43, and a pair of first tooth rows 44L. The supported portions 42 are longitudinal in the up-down direction Z. The supported portions 42 are disposed away from each other in the axial direction X. One second support hole 42A that is longitudinal in the up-down direction Z is formed in each of the supported portions 42. The second support hole 42A penetrates the supported portion 42 in the lateral direction Y.

The coupling portions 43 are longitudinal in the axial direction X. The coupling portions 43 are disposed away from each other in the up-down direction Z. The coupling portions 43 couple the supported portions 42 together. Specifically, the upper-side-Z1 coupling portion 43 is provided between upper ends of the supported portions 42. The lower-side-Z2 coupling portion 43 is provided between lower ends of the supported portions 42. In the first tooth member 41, a through-hole 45 is formed which penetrates the first tooth member 41 in the lateral direction Y. The through-hole 45 is a space enclosed with the supported portions 42 and the coupling portions 43.

The first tooth rows 44L is formed of a plurality of first teeth 44 aligned in the tilt direction C. The first teeth 44 of the front-side-X2 first tooth row 44L protrude one by one from the front-side-X2 supported portion 42 toward the rear side X1 into the through-hole 45. The first teeth 44 of the rear-side-X1 first tooth row 44L protrude one by one from the rear-side-X1 supported portion 42 toward the front side X2 into the through-hole 45. Each of the first teeth 44 of first tooth rows 44L has a tooth trace 44A extending in the lateral direction Y. A dedendum portion 44B of each of the first teeth 44 is fixed to of the supported portion 42. The first tooth member 41 is elastically deformable in the lateral direction Y as described above. However, in the first tooth member 41, at least the first tooth rows 44L may be elastically deformable in the lateral direction Y.

Figure 5:
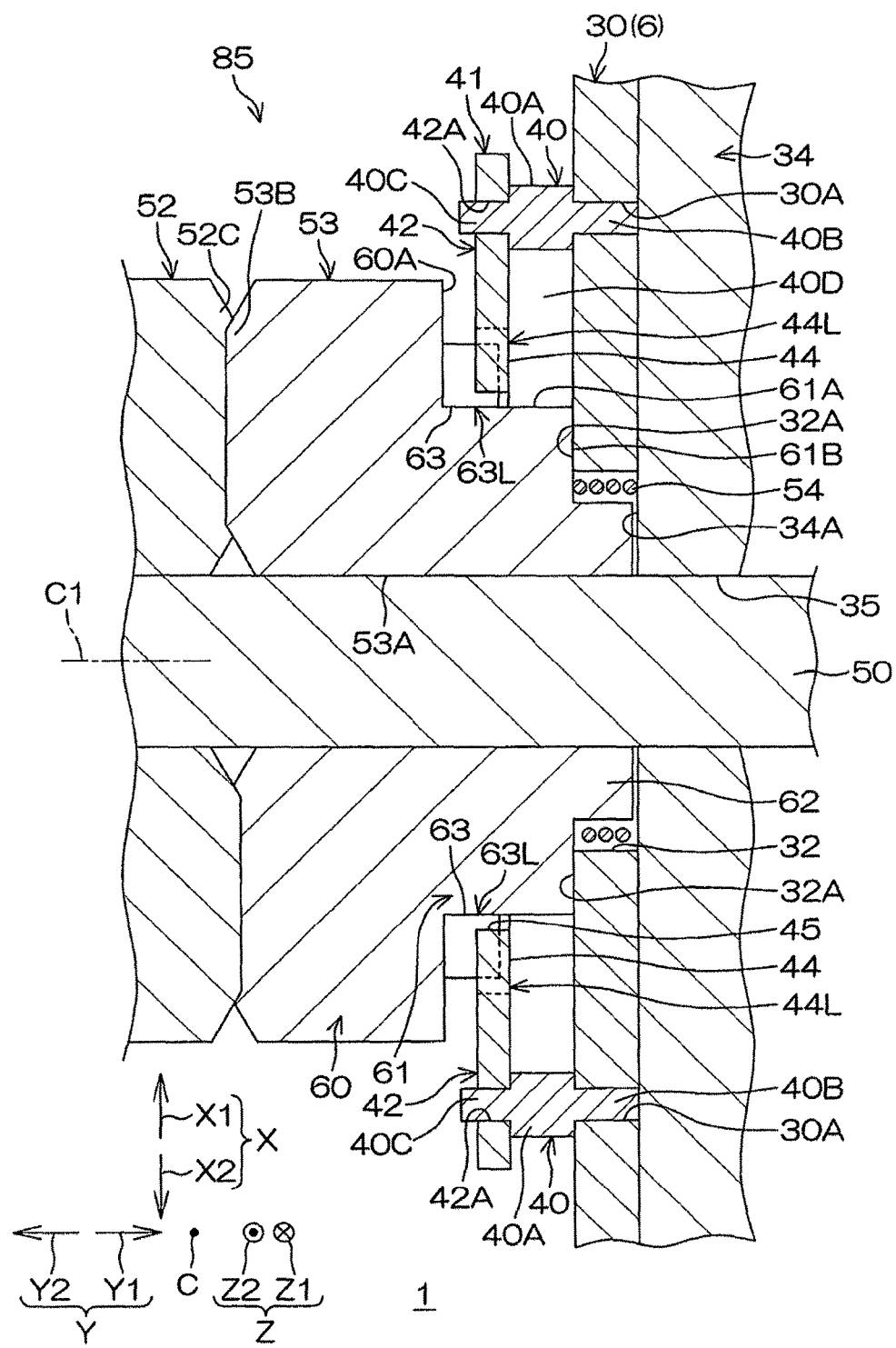
FIG. 5 is a sectional view taken along the line V-V in FIG. 3.

FIG. 5 is a sectional view taken along the line V-V in FIG. 3. As seen in FIG. 5, the first insertion portions 40B of the separation members 40 are inserted one by one from the left side Y2 through the respective first support holes 30A in the left-side-Y2 side plate 30 of the upper bracket 6 so as to be press-fitted in the first support holes 30A. Consequently, the separation members 40 are supported by the left-side-Y2 side plate 30. The second insertion portions 40C of the separation members 40 are inserted one by one from the right side Y1 through the respective second support holes 42A in the first tooth member 41 so as to be press-fitted in the second support holes 42A. Consequently, the supported portions 42 are supported by the upper bracket 6 via the separation members 40. In this state, the interposition portions 40A of the separation members 40 are interposed between the respective supported portions 42 of the first tooth member 41 and the left-side-Y2 side plate 30. Therefore, the separation members 40 support the first tooth member 41 so as to separate the first tooth rows 44L fixed to the supported portions 42 from the left-sideY2 side plate 30 on the left side Y2 of the left-side-Y2 side plate 30. A space between the first tooth member 41 and the left-side-Y2 side plate 30 is denoted by reference numeral "40D". The first tooth member 41 is fixed with respect to the left-side-Y2 side plate 30.

As seen in FIG. 3, the steering system 1 includes a clamping shaft 50, an operation member 51, a cam 52, a second tooth member 53, and an elastic member 54. The operation member 51 is disposed near the left-side-Y2 side plate 30. The clamping shaft 50 is made of metal and shaped like a rod having a central axis C1 extending in the lateral direction Y. The clamping shaft 50 is inserted through an area where the shaft insertion holes 35 and the tilt grooves 32 overlap as viewed in the lateral direction Y. The clamping shaft 50 can rotate around the central axis C1 in the shaft insertion holes 35 and the tilt grooves 32. The shaft insertion holes 35 restrict movement of the clamping shaft 50 in the axial direction X and the tilt direction C with respect to the column jacket 4. The clamping shaft 50 can move in the tilt direction C in conjunction with tilting of the column jacket 4. The clamping shaft 50 is also inserted through the through-hole 45 in the first tooth member 41. The clamping shaft 50 is positioned on the upper side Z1 with respect to the steering shaft 3.

A left end of the clamping shaft 50 is positioned on the left side Y2 with respect to the left-side-Y2 side plate 30. A right end of the clamping shaft 50 is positioned on the right side Y1 with respect to the right-side-Y1 side plate 30 of the upper bracket 6. At the left end of the clamping shaft 50, a head portion 50A is provided which has a larger diameter than the remaining part of the clamping shaft 50. A groove 50B is formed on an outer peripheral surface of the clamping shaft 50 at the right end thereof.

The operation member 51 is, for example, a lever that can be gripped. The operation member 51 includes a base end 51A that is a longitudinal end and a gripping portion 51B that is the other longitudinal end. At the base end 51A, an insertion hole 51C is formed which penetrates the operation member 51 in the lateral direction Y. The clamping shaft 50 is inserted through the insertion hole 51C. The cam 52 integrally includes an annular plate portion 52A and a boss portion 52B. The plate portion 52A is located at the right side Y1 of the base end 51A of the operation member 51 so as to be adjacent to the base end 51A. The boss portion 52B extends from the plate portion 52A toward the left side Y2. A cam protrusion 52C is provided on a right side surface of the plate portion 52A.

The clamping shaft 50 is inserted through a space defined by an inner peripheral surface of the plate portion 52A and an inner peripheral surface of the boss portion 52B so as to be press-fitted in the space. Thus, the cam 52 rotates integrally with the clamping shaft 50. The outer shape of the boss portion 52B is generally like, for example, a quadrangle as viewed in the lateral direction Y. The boss portion 52B is inserted through the insertion hole 51C in the operation member 51. Thus, the cam 52 can rotate integrally with the operation member 51. A driver grips and operates the gripping portion 51B of the operation member 51, so that the clamping shaft 50 pivots along with the operation member 51 in accordance with the operation of the operation member 51.

As seen in FIG. 4, the second tooth member 53 is shaped generally like a block. The second tooth member 53 is, for example, a metal sintered compact formed of a material having a higher strength than the upper bracket 6. The second tooth member 53 is not limited to the sintered compact. The second tooth member 53 integrally includes a main body portion 60, a protruding portion 61, a boss portion 62, and a pair of second tooth rows 63L.

The main body portion 60 is shaped like a plate that is thin in the lateral direction Y. The outer shape of the main body portion 60 is generally like a quadrangle as viewed in the lateral direction Y. In the main body portion 60, an insertion hole 53A is formed which penetrates the main body portion 60 in the lateral direction Y. The main body portion 60 is disposed on the left side Y2 with respect to the first tooth member 41 (see FIG. 3). The main body portion 60 has, as a right side surface thereof, a facing surface 60A that is flat in the lateral direction Y. The facing surface 60A lies on the left side Y2 with respect to the first tooth member 41 so as to face the first tooth member 41 (see FIG. 5).

The protruding portion 61 is shaped like a plate that is thin in the lateral direction Y. The protruding portion 61 protrudes toward the right side Y1, that is, toward the first tooth member 41, with respect to the facing surface 60A of the main body portion 60. The protruding portion 61 has a pair of orthogonal surfaces 61A and a pressing surface 61B. The orthogonal surfaces 61A forms end surfaces of the protruding portion 61 in the axial direction X to cross the facing surface 60A of the main body portion 60 at right angles. The pressing surface 61B forms a right side surface of the protruding portion 61. One of the orthogonal surfaces 61A is a front surface of the protruding portion 61, and the other orthogonal surface 61A is a rear surface of the protruding portion 61. The orthogonal surfaces 61A extend in the tilt direction C. As seen in FIG. 5, the protruding portion 61 is inserted through the through-hole 45 in the first tooth member 41 from the left side Y2. The pressing surface 61B lies on the left side Y2 with respect to a peripheral portion 32A of the tilt groove 32 in the left-side-Y2 side plate 30 so as to face the peripheral portion 32A.

The boss portion 62 is shaped like a cylinder protruding from the protruding portion 61 toward the right side Y1 (see FIG. 4). The boss portion 62 is inserted through the left-side-Y2 tilt groove 32 from the left side Y2. The insertion hole 53A in the main body portion 60 also penetrates the protruding portion 61 and the boss portion 62 along the lateral direction Y. As seen in FIG. 3, the clamping shaft 50 is inserted through the insertion hole 53A in the second tooth member 53 so as to have play between the clamping shaft 50 and the insertion hole 53A. The second tooth member 53 is supported by the clamping shaft 50. Thus, the second tooth member 53 can move in the tilt direction C along with the clamping shaft 50, which moves in conjunction with tilting of the column jacket 4.

The second tooth member 53 is located at the right side Y1 of the cam 52 so as to be adjacent to the cam 52. On a left side surface of the main body portion 60 of the second tooth member 53, a cam protrusion 53B is formed onto which the cam protrusion 52C of the cam 52 can rides. In accordance with an operation of the operation member 51, the cam 52 rotates and rides onto the cam protrusion 53B. Consequently, the second tooth member 53 can move in the lateral direction Y along the central axis C1 of the clamping shaft 50.

As seen in FIG. 4, each of the second tooth rows 63L includes a plurality of second teeth 63 aligned along the tilt direction C. The second tooth rows 63L protrude outward from the respective orthogonal surfaces 61A of the protruding portion 61 in the axial direction X. As seen in an enlarged view of a part of FIG. 4 enclosed by a long dashed double-short dashed line, each of the second teeth 63 of the second tooth rows 63L has, as a tip thereof, a tooth trace 63A extending in the lateral direction Y. Each of the second teeth 63 has an end 63B that is a left end in a tooth tip direction (corresponding to the lateral direction Y) and a dedendum portion 63C. The ends 63B of the second teeth 63 are fixed to the facing surface 60A of the main body portion 60. The dedendum portions 63C of the second teeth 63 are fixed to a left area of the orthogonal surface 61A of the protruding portion 61.

As seen in FIG. 4, the elastic member 54 is, for example, a coil spring. The elastic member 54 is elastically deformable in the lateral direction Y. As seen in FIG. 5, the elastic member 54 externally surrounds the boss portion 62 of the second tooth member 53 in a radial direction of the boss portion 62. The elastic member 54 is disposed so as to be compressed in the lateral direction Y between the pressing surface 61B of the protruding portion 61 of the second tooth member 53 and the left side surface 34A of the left-side-Y2 clamped portion 34 of the lower jacket 23.

As seen in FIG. 3, the steering system 1 includes a pair of separation members 65, a first tooth member 66, an elastic member 67, a second tooth member 68, a nut 69, a needle roller bearing 70, and a thrust washer 71. The separation members 65 are disposed near the right-side-Y1 side plate 30. FIG. 3 depicts only one of the separation members 65. The separation members 65, the first tooth member 66, and the elastic member 67 on the right side Y1 are obtained by inverting the separation members 40, the first tooth member 41, and the elastic member 54 on the left side Y2, respectively, with respect to the reference plane 3D. Thus, the components of the separation members 65, the first tooth member 66, and the elastic member 67 are denoted by the same reference numerals as those of the corresponding components of the separation members 40, the first tooth member 41, and the elastic member 54 and description thereof will be omitted below.

The right-side-Y1 second tooth member 68 is approximately equal to a shape obtained by inverting the left-side-Y2 second tooth member 53 with respect to the reference plane 3D. The components of the second tooth member 68 are denoted by the same reference numerals as those of the second tooth member 53 and description thereof will be omitted below. However, unlike in the left-side-Y2 second tooth member 53, the cam protrusion 53B is not formed in the right-side-Y1 second tooth member 68.

The nut 69 is attached to the groove 50B in the clamping shaft 50. Between the nut 69 and the right-side-Y1 side plate 30, the first tooth member 66, the second tooth member 68, the needle roller bearing 70, and the thrust washer 71 are disposed in this order from the left side Y2. The clamping shaft 50 is inserted through each of the through-hole 45 in the first tooth member 66, the insertion hole 53A in the second tooth member 68, the needle roller bearing 70, and the thrust washer 71.

The left-side-Y2 side plate 30, the separation members 40, the first tooth member 41, the second tooth member 53, and the elastic member 54 are included in a left-side-Y2 tilt lock mechanism 85. The tilt lock mechanism 85 is a mechanism configured to firmly lock the column jacket 4 in position in the tilt direction C and to release the lock of the column jacket 4 in position. Similarly, the right-side-Y1 side plate 30, the separation members 65, the first tooth member 66, the second tooth member 68, and the elastic member 67 are included in a right-side-Y1 tilt lock mechanism 86.

The steering system 1 includes a tubular lock member 75, a transmission member 76, and a plate-like lock plate 77 extending in the axial direction X. The lock member 75, the transmission member 76, and the lock plate 77 are disposed between the clamped portions 34 as viewed in the axial direction X. The lock member 75 is rotatably supported by the clamping shaft 50. The lock plate 77 is fixed to the upper jacket 22. The transmission member 76 includes a cam and a spring. The cam transmits rotation of the clamping shaft 50 to the lock member 75. The spring biases the lock member 75 toward the lock plate 77.

A tooth portion 75A provided on the lock member 75 meshes with a tooth portion 77A provided on the lock plate 77. Consequently, the steering member 11 (see FIG. 1) is firmly locked (a form during a locked state described below) in position in the axial direction X. Meshing between the tooth portion 75A and the tooth portion 77A is released. This release the lock of the steering member 11 in position in the axial direction X (a form during a released state described below). As described above, the lock member 75, the transmission member 76, and the lock plate 77 are included in a telescopic lock mechanism 78.

Now, operations of the steering system 1 will be described. The characteristic tilt lock mechanism 85 will be described below, and description of the telescopic lock mechanism 78 will be omitted. After performing tilt adjustment or telescopic adjustment, the driver rotates the operation member 51. The second tooth member 53 moves toward the right side Y1 along the central axis C1 of the clamping shaft 50 while compressing the elastic member 54. As depicted in FIG. 5, the peripheral portion 32A of the tilt groove 32 in the left-side-Y2 side plate 30 is pressed by the pressing surface 61B of the protruding portion 61. As seen in FIG. 3, the pressing reduces the distance between the second tooth member 53 and the second tooth member 68 in the lateral direction Y. Between the second tooth member 53 and the second tooth member 68, the side plates 30 are clamped from the opposite sides in the lateral direction Y. Each of the side plates 30 and the corresponding clamped portion 34 are frictionally held together, and the lower jacket 23 and the upper jacket 22 are frictionally held together. This precludes pivoting and extension and contraction of the column jacket 4 and makes the steering member 11 (see FIG. 1) immovable in the tilt direction C and the axial direction X.

A state of the steering system 1 where the position of the steering member 11 is fixed in the tilt direction C and the axial direction X is referred to as a "locked state". During normal driving, the steering system 1 is in the locked state. In the steering system 1 in the locked state, the operation member 51 is rotated in a direction opposite to the direction described above. The second tooth member 53 is biased by the elastic member 54 to move toward the left side Y2. This increases the distance between the second tooth member 53 and the second tooth member 68. Clamping of the side plates 30 between the second tooth member 53 and the second tooth member 68 is released. The frictional holding of each side plates 30 and the corresponding clamped portion 34 is released, and the frictional holding of the lower jacket 23 and the upper jacket 22 is released. Thus, the steering member 11 (see FIG. 1) is made movable in the tilt direction C and in the axial direction X.

A state of the steering system 1 where the fixation of the position of the steering member 11 in the tilt direction C and the axial direction X is released is referred to as a "released state". A clamping mechanism 80 includes the clamping shaft 50, the operation member 51, the cam 52, the second tooth member 53, the second tooth member 68, the nut 69, the needle roller bearing 70, and the thrust washer 71. The clamping mechanism 80 enables tilt adjustment and telescopic adjustment for the steering member 11 (see FIG. 1). The clamping mechanism 80 locks the steering member 11 in position after the tilt adjustment or the telescopic adjustment is completed.

Figure 6:
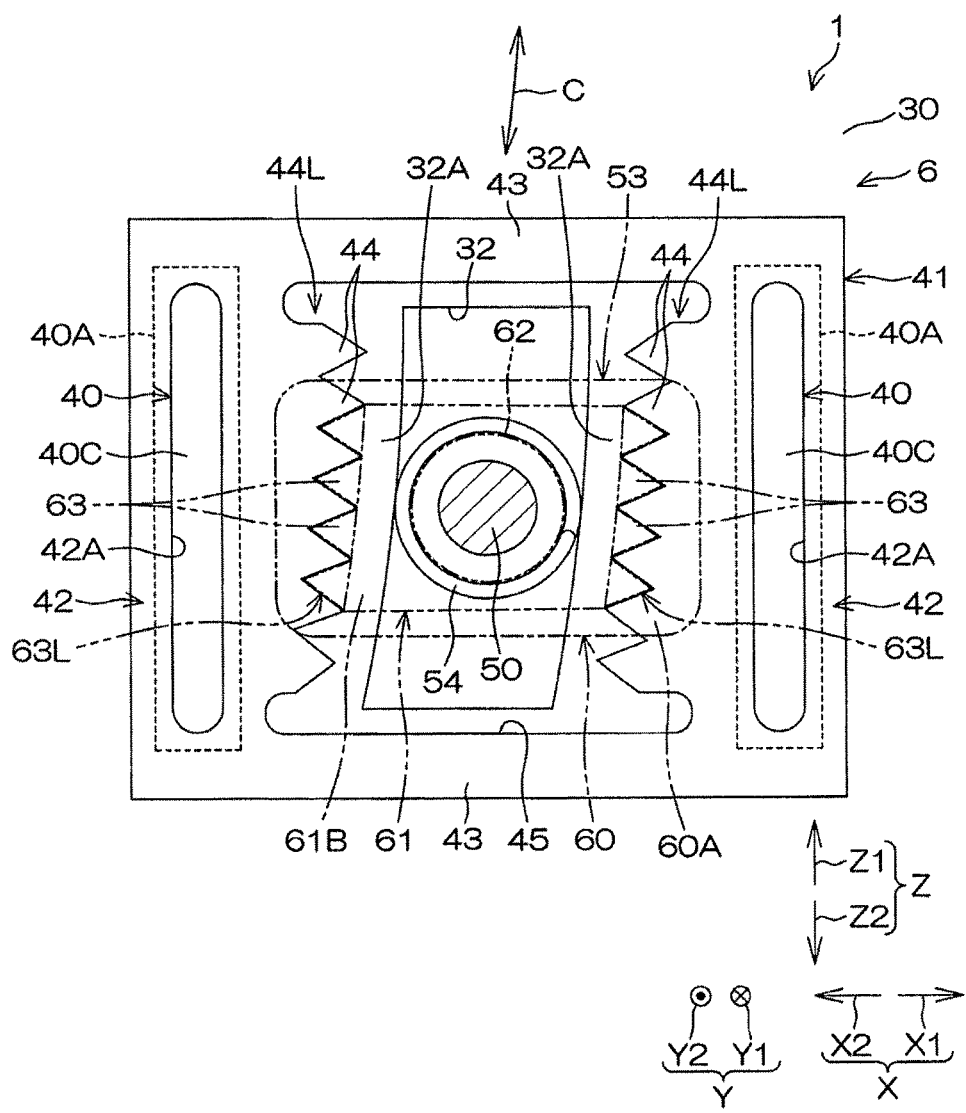
FIG. 6 is a sectional view taken along the line VI-VI in FIG. 3.

In the locked state, the first teeth 44 of the first tooth rows 44L and the second teeth 63 of the second tooth rows 63L overlap (phase shift) or do not overlap (phase matching) depending on a tilt adjustment position. FIG. 6 is a sectional view taken along the line VI-VI in FIG. 3. In FIG. 6, for convenience of description, the second tooth member 53 is represented by a long dashed double-short dashed line, and members located away from the viewer in the drawing plane of FIG. 6 behind the second tooth member 53 are represented by continuous lines. As seen in FIG. 3, operations of the separation members 65, the first tooth member 66, the elastic member 67, and the second tooth member 68, which are disposed around the right-side-Y1 side plate 30 are the same as those of the separation members 40, the first tooth member 41, the elastic member 54, and the second tooth member 53, which are disposed around the left-side-Y2 side plate 30. Therefore, a configuration around the left-side-Y2 side plate 30 will be described below in detail. Description of a configuration around the right-side-Y1 side plate 30 will be omitted.

As depicted in FIG. 6, when the second tooth member 53 moves toward the right side Y1 in accordance with an operation of the operation member 51 (see FIG. 3), if the first teeth 44 of first tooth rows 44L and the second teeth 63 of the second tooth rows 63L are in a positional relation in which the first teeth 44 and the second teeth 63 do not overlap as viewed from the left side Y2, the positional relation changes when the operation of the operation member 51 is completed. That is, the first teeth 44 and the second teeth 63 are alternately aligned in the tilt direction C and the pressing surface 61B of the protruding portion 61 presses the peripheral portions 32A of the tilt groove 32 in the left-side-Y2 side plates 30. Therefore, the locked state can be reached without obstruction by the first teeth 44 of first tooth rows 44L and the second teeth 63 of second tooth rows 63L.

Figure 7:
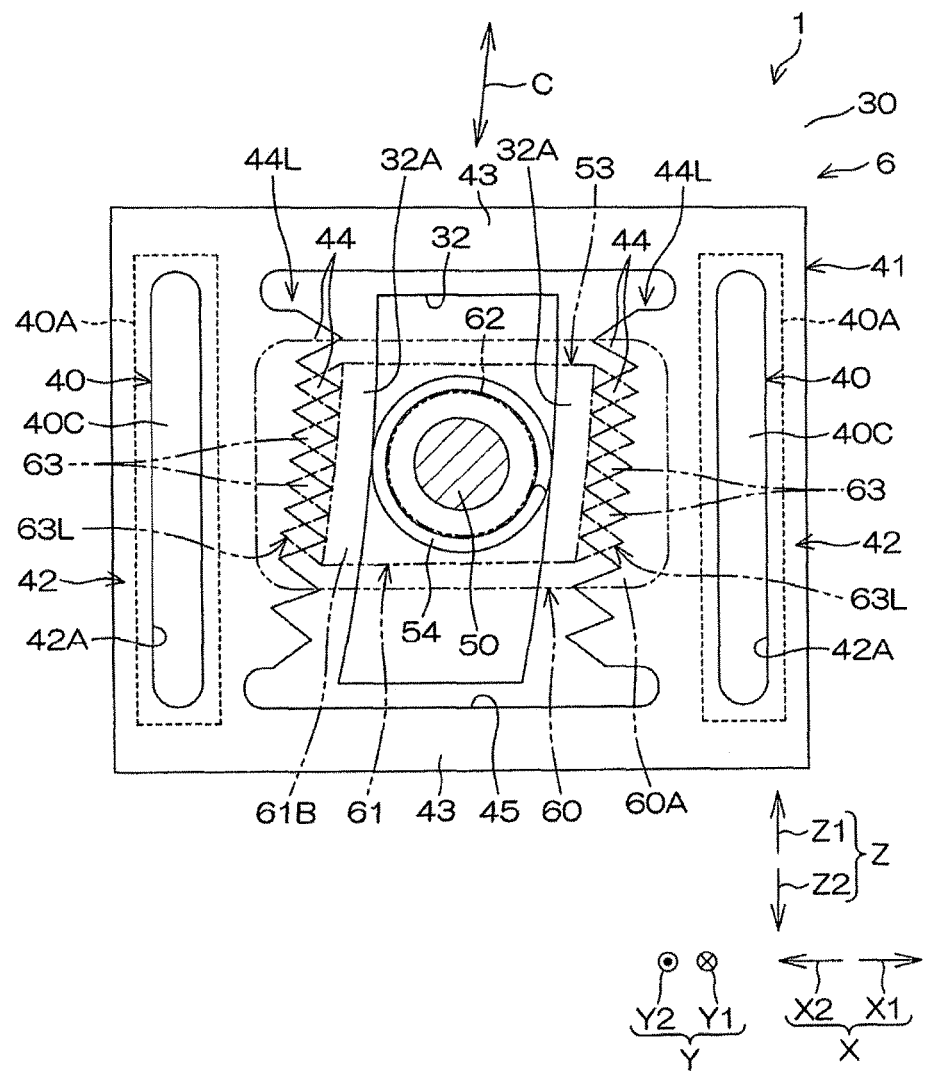
FIG. 7 illustrates that, in FIG. 6, second tooth rows have ridden onto first tooth rows.

FIG. 7 is a diagram illustrating that, in FIG. 6, the second tooth rows 63L have ridden onto the respective first tooth rows 44L. As depicted in FIG. 7, when the second tooth member 53 moves toward the right side Y1, if the first teeth 44 of first tooth rows 44L and the second teeth 63 of the second tooth rows 63L are in a positional relation in which the first teeth 44 and the second teeth 63 overlap as viewed from the left side Y2, the second tooth rows 63L ride onto the first tooth rows 44L before the pressing surface 61B of the protruding portion 61 presses the peripheral portions 32A of the tilt groove 32 in the left-side-Y2 side plates 30. A state where the second tooth rows 63L ride onto and fail to mesh with the first tooth rows 44L is referred to as a tooth-on-tooth state. Even when failing to mesh with each other, each first tooth row 44L and the corresponding second tooth row 63L are in pressure contact with each other.

Figure 8:
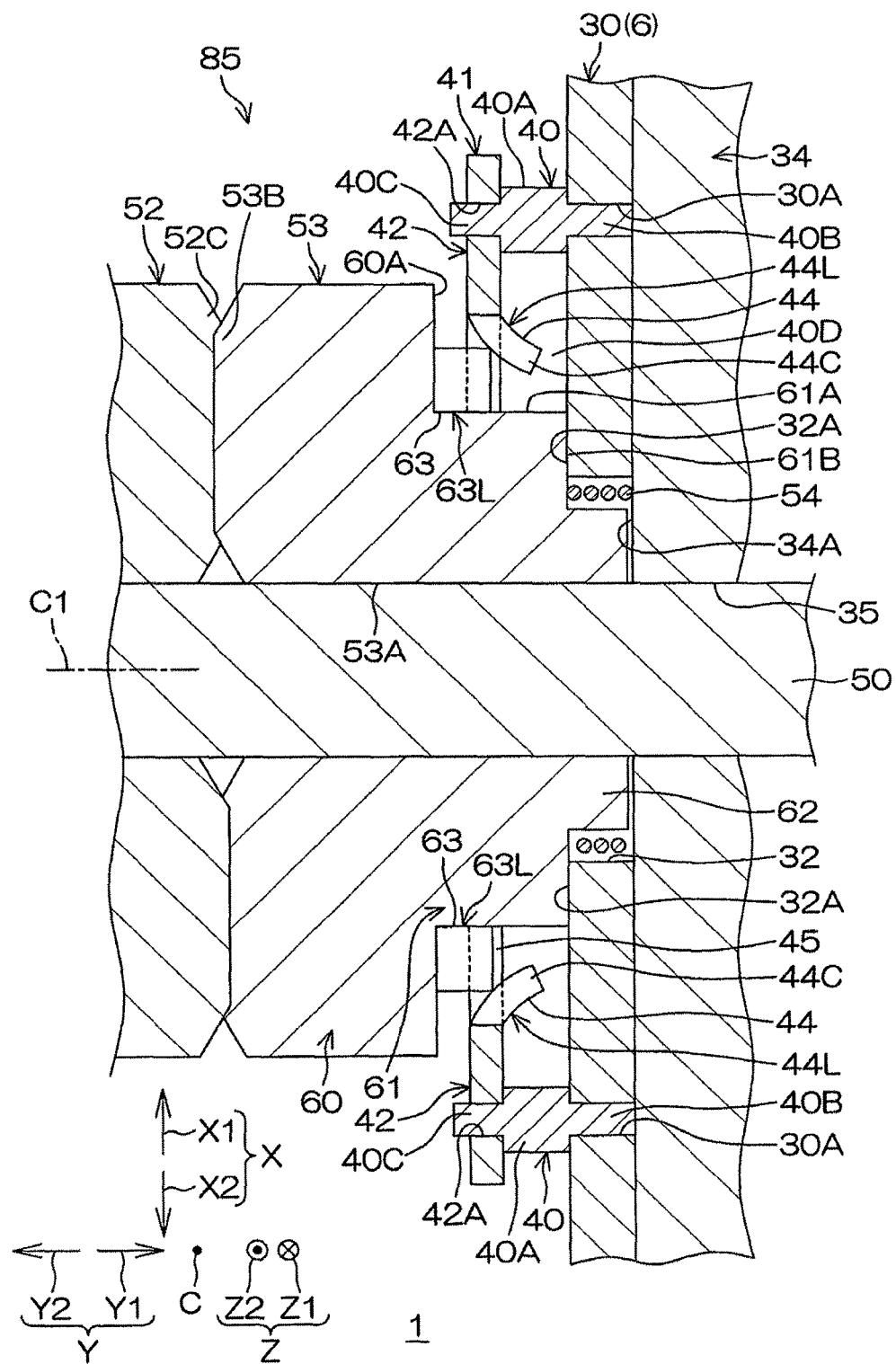
FIG. 8 illustrates that, in FIG. 5, the second tooth rows have ridden onto the first tooth rows in FIG. 5.

FIG. 8 illustrates that, in FIG. 5, the second tooth rows 63L has ridden onto the respective first tooth rows 44L. As seen in FIG. 8, the separation members 40 support the first tooth member 41 so as to separate the first tooth rows 44L from the left-side-Y2 side plate 30 on the left side Y2 of the left-side-Y2 side plate 30, as described above. Thus, the space 40D is present at the right side Y1 of each first tooth row 44L. Therefore, when the second tooth rows 63L ride onto the first tooth rows 44L, the first teeth 44 of the first tooth rows 44L can be deflected toward the left-side-Y2 side plate 30. In this state, tooth tips 44C of the first teeth 44 are housed in the space 40D.

As described above, even in the tooth-on-tooth state, the first teeth 44 are deflected to allow the second tooth member 53 to move until the pressing surface 61B of the protruding portion 61 of the second tooth member 53 presses the left-side-Y2 side plate 30. Therefore, the operation member 51 does not become non-rotatable during operation, and the steering system 1 can reach the locked state. A state where, in the tooth-on-tooth state, the pressing surface 61B is precluded from pressing the left-side-Y2 side plate 30 is referred to as half lock, which means that the steering system 1 has not reached the locked state.

Figure 9:
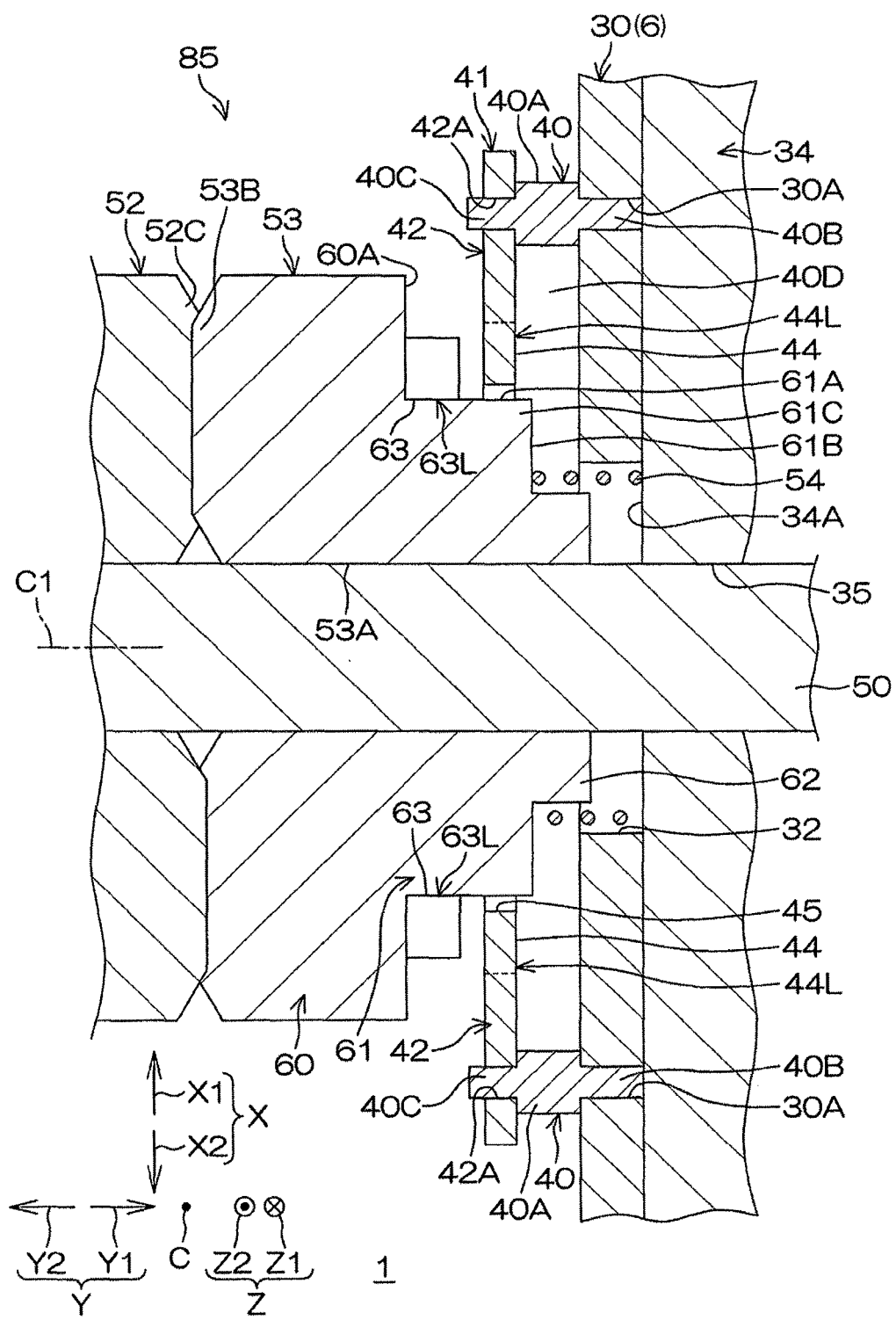
FIG. 9 is a diagram illustrating a released state in FIG. 5.

As described above, the steering system 1 can be brought into the locked state regardless of the positional relation between the first tooth rows 44L and the respective second tooth rows 63L. That is, what is called stepless lock can be achieved in which the steering system 1 can be brought into the locked state regardless of whichever tilt adjustment position is set. FIG. 9 is a diagram illustrating the released state in FIG. 5.

As described above, when the locked state changes to the released state, the second tooth member 53 moves toward the left side Y2 due to the biasing force of the elastic member 54. Thus, the second tooth rows 63L of the second tooth member 53 are separated from the respective first tooth rows 44L of the first tooth member 41 toward the left side Y2, as depicted in FIG. 9. If, in the locked state, the first teeth 44 are deflected due to the tooth-on-tooth state, the first teeth 44 return to an elastically undeformed state as a result of a change from the locked state to the released state.

In the released state, a part of the protruding portion 61 of the second tooth member 53 located on the right side Y1 with respect to a part 61C of the protruding portion 61 to which the second tooth row 63L is fixed is inserted through the through-hole 45. Thus, the orthogonal surfaces 61A of the protruding portion 61 and the first tooth rows 44L prevent the second tooth member 53 from running idly with respect to the clamping shaft 50. Now, operations of the steering system 1 at the time of a vehicle collision will be described.

As seen in FIG. 1, at the time of a vehicle collision, when a secondary collision occurs in which the driver collides against the steering member 11, a resultant impact is transmitted to the steering member 11. The impact is decomposed into a component in the tilt direction C and a component in the axial direction X. The component force in the tilt direction C causes the column jacket 4, which holds the steering shaft 3 with the steering member 11 coupled thereto, to move in the tilt direction C. Thus, as seen in FIG. 3, the second tooth member 53 acts to move in the tilt direction C along with the column jacket 4. On the other hand, the first tooth member 41, which is supported by the upper bracket 6 fixed to the vehicle body 2 (see FIG. 1), does not move in the tilt direction C.

As depicted in FIG. 5 and FIG. 6, when the first teeth 44 of first tooth rows 44L and the second teeth 63 of the respective second tooth rows 63L are alternately aligned instead of overlapping, the first teeth 44 mesh with the second teeth 63 to fix the position of second tooth rows 63L in the tilt direction C with respect to the respective first tooth rows 44L. The second tooth rows 63L are each subjected to a force generated between the second tooth row 63L and the first tooth row 44L and acting in the tilt direction C. On the other hand, when the second tooth rows 63L ride onto the first tooth rows 44L as depicted in FIG. 8, the first teeth 44 are elastically deformed in the lateral direction Y and deflected toward the right side Y1 as described above. In this state, application of the component force in the tilt direction C causes the first tooth rows 44L to return, after the second tooth member 53 starts moving, to the elastically undeformed state at a position where the second tooth rows 63L do not ride onto the first tooth rows 44L. As depicted in FIG. 5, the first tooth rows 44L and the second tooth rows 63L then mesh with each other.

The first tooth rows 44L mesh with the respective second tooth rows 63L to substantially increase a holding force that holds the column jacket 4 in the tilt direction C. This enables the column jacket 4 to be restrained from running idly during an initial period of the secondary collision, and to stabilize detaching performance demonstrated at the time of the secondary collision. During meshing at the time of the secondary collision, each second tooth row 63L is subjected to the force generated between the second tooth row 63L and the corresponding first tooth row 44L and acting in the tilt direction C. Therefore, the second teeth 63 of second tooth rows 63L need to have a predetermined strength (to be exact, a predetermined shear strength) or higher in order to withstand the impact at the time of the secondary collision.

In the steering system 1, the first tooth rows 44L of the first tooth member 41, located closer to the vehicle body 2, is configured to be elastically deformable. This eliminates the need to configure the second tooth member 53, which moves in accordance with an operation of the operation member 51, to be elastically deformable. Therefore, a material for the second tooth member 53 is not limited to an elastically deformable material, and any of various materials having a needed shear strength may be freely selected.

Since the second tooth member 53 has a higher strength than the upper bracket 6, the shear strength of the second teeth 63 can be improved. Since the second tooth member 53 contains a sintered compact, the shear strength of the second teeth 63 can be further improved. In each second tooth row 63L, the dedendum portions 63C of the second teeth 63 are fixed to the protruding portion 61 of the second tooth member 53, and the ends 63B of the second teeth 63 in the lateral direction Y are further fixed to the main body portion 60 of the second tooth member 53. Thus, compared to a configuration in which only the dedendum portions 63C are fixed to the protruding portion 61 with the ends 63B in the lateral direction Y not fixed to the main body portion 60, the present configuration enables an increase in the shear area of the second teeth 63 as hatched in an enlarged view of a part of FIG. 4 enclosed by a long dashed double-short dashed line. Therefore, the shear strength of the second teeth 63 can further be improved.

The improved shear strength of the second teeth 63 allows the second teeth 63 to withstand a higher impact at the time of the secondary collision. This increases the force that holds the position of the steering member 11 in the tilt direction C, that is, a tilt holding force. Compared to a configuration in which only the dedendum portions 63C are fixed to the protruding portion 61 with the ends 63B in the lateral direction Y not fixed to the main body portion 60, the present configuration enables a reduction in the number of needed second teeth 63 as a result of the improved shear strength of the second teeth 63. This enables a reduction in the size of the second tooth member 53.

In the tilt lock mechanism 85 in the present embodiment, when the first tooth rows 44L mesh with the respective second tooth rows 63L, the first teeth 44 and the second teeth 63 overlap as viewed in the axial direction X. On the other hand, in a configuration in a comparative example in which tooth traces extend orthogonally to the central axis C1 of the clamping shaft 50 unlike in the tilt lock mechanism 85 in the present embodiment, the teeth, meshed with one another, are aligned in the lateral direction Y. Thus, the tilt lock mechanism 85 in the present embodiment is allowed to be smaller than a tilt lock mechanism configured in accordance with the comparative example.

Figure 10:
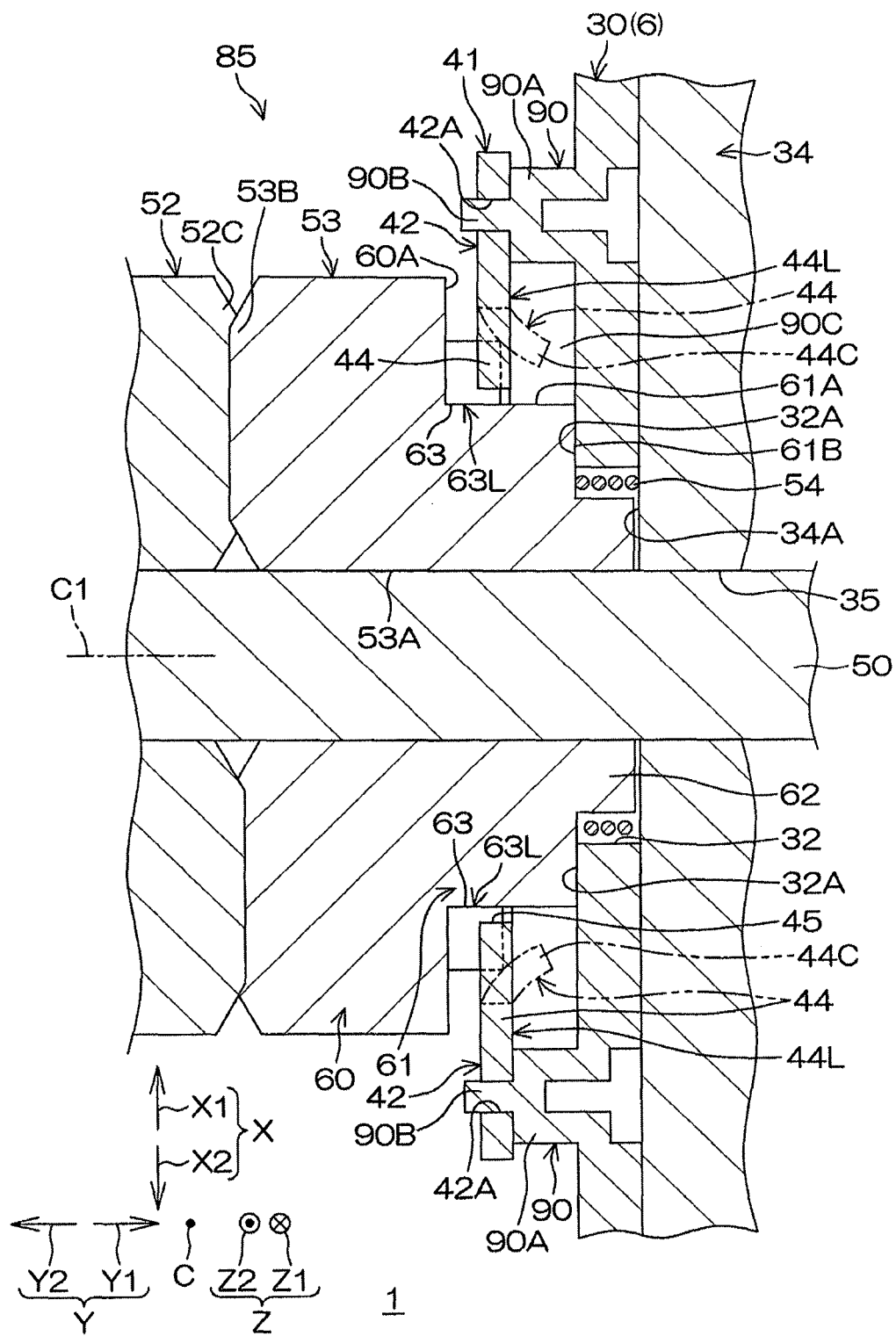
FIG. 10 is a schematic diagram depicting a first variation of the invention.

The right-side-Y1 tilt lock mechanism 86 produces effects similar to the effects of the left-side-Y2 tilt lock mechanism 85. Now, a first variation of the invention will be described. FIG. 10 is a schematic diagram depicting the first variation of the invention. In FIG. 10, members that are similar to those described above are denoted by the same reference numerals as those described above and description thereof will be omitted below (this also applies to FIG. 11 and FIG. 12 described below).

As seen in FIG. 10, a pair of separation members 90 in the first variation is integrated with the left-side-Y2 side plate 30. The separation members 90 are formed by press molding such that the left-side-Y2 side plate 30 is extruded in two steps from the right side Y1. Each of the separation members 90 includes a first protrusion 90A and a second protrusion 90B. The first protrusion 90A is an interposition portion extruded by press molding in the first step. The second protrusion 90B is a second insertion portion extruded by press molding in the second step.

Each of the first protrusions 90A is interposed between the first tooth member 41 and the left-side-Y2 side plate 30. The second protrusions 90B are inserted into the respective second support holes 42A in the first tooth member 41 so as to be press-fitted in the second support holes 42A. Consequently, the first tooth member 41 is supported by the upper bracket 6 via the separation members 90. Therefore, the separation members 90 support the first tooth member 41 so as to separate the first tooth rows 44L from the left-side-Y2 side plate 30 on the left side Y2 of the left-side-Y2 side plate 30.

Each of the first protrusions 90A forms a space 90C between the first tooth member 41 and the left-side-Y2 side plate 30. When, in the tooth-on-tooth state, the first teeth 44 are deflected toward the right side Y1, the tooth tips 44C are housed in the space 90C (see a long dashed double-short dashed line in FIG. 10). The first variation produces effects similar to the effects of the present embodiment. The first variation eliminates the need to provide the separation members 90 separately from the side plates 30, enabling a reduction in the number of components.

Figure 11:
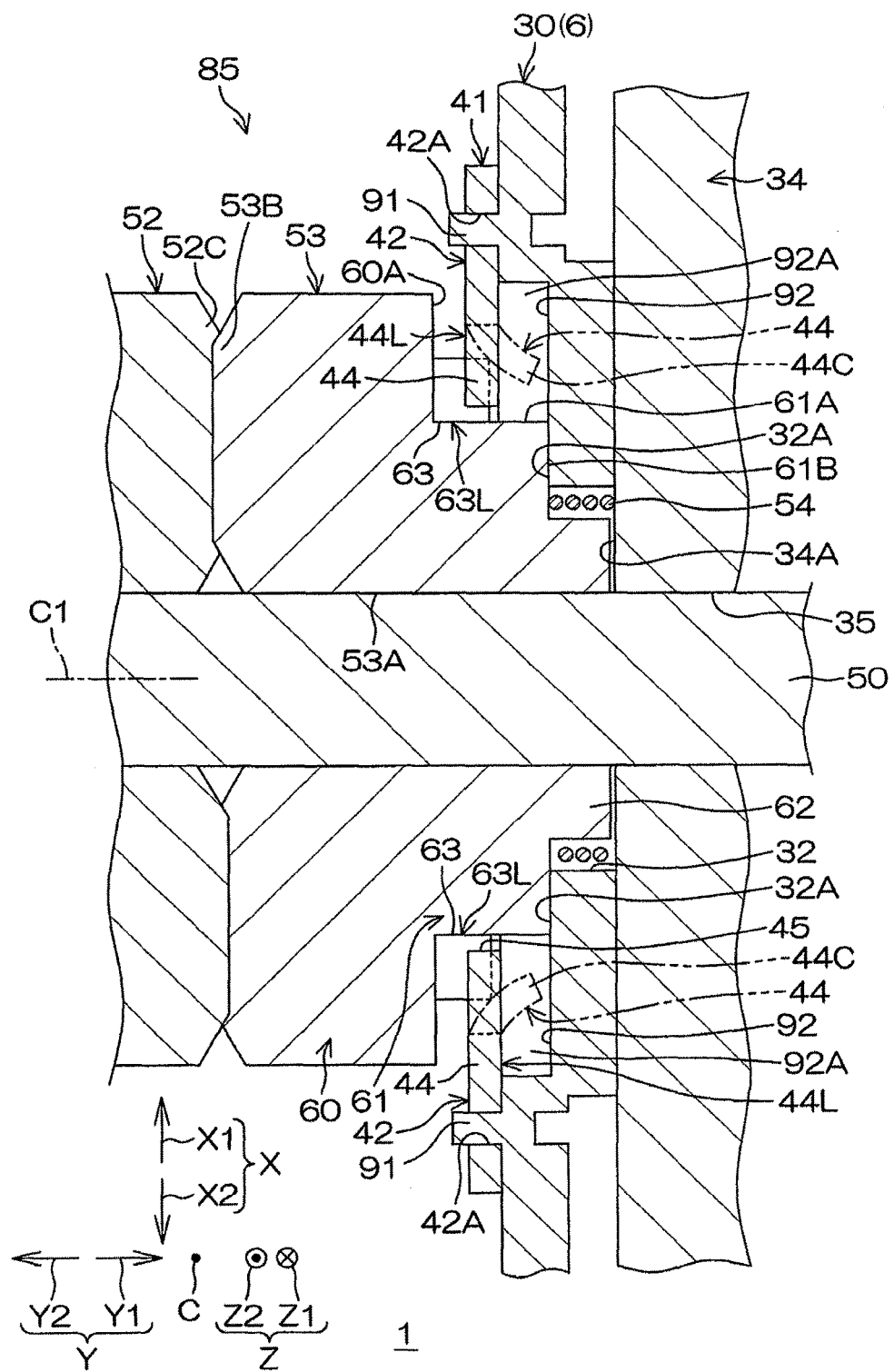
FIG. 11 is a schematic diagram depicting a second variation of the invention.

Now, a second variation of the invention will be described. As seen in FIG. 11 that is a schematic diagram depicting the second variation of the invention, the steering system 1 in the second variation does not include the separation members 40 in the present embodiment (see FIG. 5) or the separation members 90 in the first variation (see FIG. 10). The steering system 1 in the second variation includes a pair of protruding portions 91 and a recessed portion 92. The protruding portions 91 are formed by press molding such that the left-side-Y2 side plate 30 is extruded from the right side Y1. The recessed portion 92 is formed by press molding such that the left-side-Y2 side plate 30 is extruded from the left side Y2.

The protruding portions 91 are located away from each other in the axial direction X. The protruding portions 91 are inserted into the respective second support holes 42A in the first tooth member 41 so as to be press-fitted in the second support holes 42A. Consequently, the first tooth member 41 is supported by the upper bracket 6. The recessed portion 92 forms a space 92A between the first tooth member 41 and the left side Y2 side plates 30. The space 92A is interposed between the left side Y2 side plate 30 of the upper bracket 6 and the first tooth rows 44L. As described above, the first tooth member 41 is supported by the left-side-Y2 side plate 30 such that the first tooth rows 44L are separated from the left-side-Y2 side plate 30 on the left side Y2 of the left-side-Y2 side plate 30. When, in the tooth-on-tooth state, the first teeth 44 are deflected toward the right side Y1, the tooth tips 44C are housed in the space 92A (see a long dashed double-short dashed line in FIG. 11).

The second variation produces effects similar to the effects of the present embodiment. The second variation eliminates the need to provide members separately from the left-side-Y2 side plate 30, which are configured to dispose the first tooth rows 44L away from the left-side-Y2 side plates 30. Thus, it is possible to reduce the number of components needed. The first variation and the second variation may be applied to the right-side-Y1 tilt lock mechanism 86.

Figure 12:
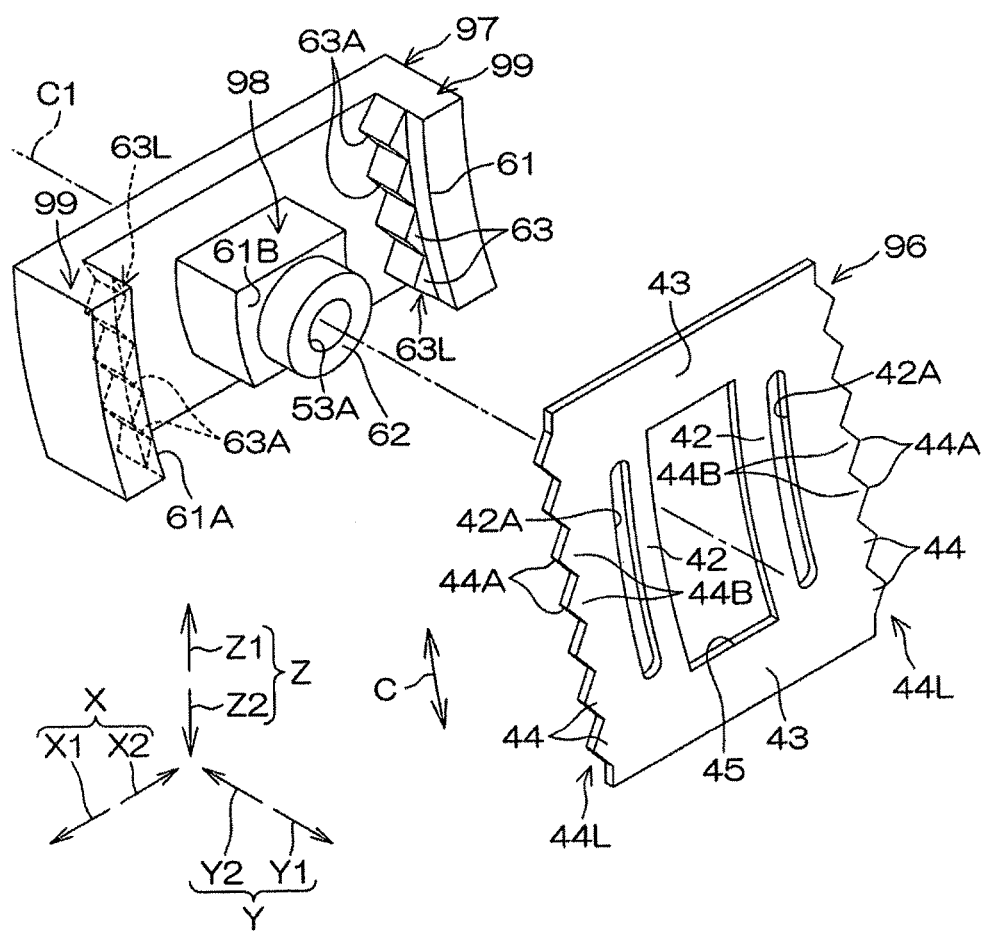
FIG. 12 is an exploded perspective view of a first tooth member and a second tooth member in a third variation of the invention.

Now, a third variation of the invention will be described. FIG. 12 is an exploded perspective view of a first tooth member 96 and a second tooth member 97 in the third variation of the invention. As seen in FIG. 12, the steering system 1 in the third variation includes the first tooth member 96 and the second tooth member 97 instead of the first tooth member 41 and the second tooth member 53 in the present embodiment.

Specifically, the first tooth rows 44L protrude outward from the respective supported portions 42 of the first tooth member 96 in the axial direction X. In the first tooth member 96, the dedendum portions 44B of the first teeth 44 in the third variation are disposed in an inner side with respect to the tooth traces 44A in the axial direction X. The second tooth member 97 includes a first protruding portion 98 and a pair of second protruding portions 99 instead of the protruding portion 61. A right side surface of the first protruding portion 98 is the pressing surface 61B. The boss portion 62 protrudes from the first protruding portion 98 toward the right side Y1.

The second protruding portions 99 are disposed away from each other with the first protruding portion 98 interposed therebetween in the axial direction X. Inner surfaces of the second protruding portions 99 in the axial direction X are the orthogonal surfaces 61A. In the second tooth member 97, the dedendum portions 63C of the second teeth 63 in the third variation are disposed on the outer side with respect to the tooth traces 63A in the axial direction X. The second tooth member 97 moves toward the right side Y1 in accordance with an operation of the operation member 51 to mesh the first tooth rows 44L with the respective second tooth rows 63L. In this state, the second protruding portions 99 are positioned so as to sandwich the first tooth member 96 between the second protruding portions 99 in the axial direction X.

The third variation produces effects similar to the effects of the present embodiment. The invention is not limited to the above-described embodiment, but various changes may be made to the embodiment within the scope of the claims. For example, unlike in the present embodiment, the steering system 1 may include one of the left-side-Y2 tilt lock mechanism 85 and the right-side-Y1 tilt lock mechanism 86.

The elastic member 54 may be disposed between the peripheral portions 32A of the tilt groove 32 and the pressing surface 61B of the protruding portion 61 of the second tooth member 53. The steering system 1 is not limited to the telescopic lock mechanism 78 but may include a telescopic lock mechanism with a different structure. Unlike in the present embodiment, the steering system 1 may not include the telescopic lock mechanism 78.

The steering system 1 may not include the telescopic adjustment function but include only a tilt adjustment function. The lower jacket 23 may be of any configuration as long as the lower jacket 23 is sandwiched between the side plates 30 so that the diameter of the lower jacket 23 is reduced to hold the upper jacket 22. For example, the slit 33 may be closed at a front-side-X2 end thereof. The steering system 1 may be configured to hold the upper jacket 22 without the lower jacket 23.

The tilt lock mechanism 85 and the tilt lock mechanism 86 are also applicable to a steering system 1 of a capsule type having a capsule (not depicted in the drawings) that couples the coupling plate 31 of the upper bracket 6 (see FIG. 2) and the vehicle body 2 (see FIG. 1) together unlike in the present embodiment. At the time of the secondary collision, a resin pin (not depicted in the drawings) inserted so as to extend across the capsule and the coupling plate 31 is broken to detach the upper bracket 6 from the vehicle body 2.

The steering system 1 is not limited to a manual steering system in which steering of the steering member 11 is not assisted but may be a column-assist electric power steering system (C-EPS) in which steering of the steering member 11 is assisted by an electric motor.

What is claimed is:

1. A steering system comprising:
    a steering shaft with a steering member coupled to the steering shaft at one end thereof;
    a column jacket that holds the steering shaft and that is movable in a tilt direction extending upward and downward so as to cross an axial direction of the steering shaft;
    a bracket fixed to a vehicle body to support the column jacket;
    an operation member that is operated to enable and disable movement of the column jacket with respect to the bracket;
    a first tooth member provided with a first tooth row that includes a plurality of first teeth each of which has a tooth trace extending in an orthogonal direction orthogonal to both the axial direction and the tilt direction and which are aligned along the tilt direction, the first tooth row being elastically deformable in the orthogonal direction, the first tooth member being supported by the bracket such that the first tooth row is disposed away from the bracket in the orthogonal direction; and
    a second tooth member including a second tooth row that includes a plurality of second teeth each of which has a tooth trace extending in the orthogonal direction and which are aligned along the tilt direction, the second tooth member facing the first tooth member in the orthogonal direction, being movable in the tilt direction along with the column jacket, and also being movable in the orthogonal direction in accordance with an operation of the operation member.

2. The steering system according to claim 1, wherein the second tooth member has a higher strength than the bracket.

3. The steering system according to claim 1, wherein the second tooth member contains a sintered compact.

4. The steering system according to claim 1, wherein the second tooth member integrally includes:
    a main body portion that has a facing surface facing the first tooth member in the orthogonal direction; and
    a protruding portion that protrudes toward the first tooth member from the facing surface and that has an orthogonal surface orthogonal to the facing surface,
    each of the second teeth includes an end in a tooth trace direction and a dedendum portion, and
    the end is fixed to the facing surface, and the dedendum portion is fixed to the orthogonal surface.

5. The steering system according to claim 1, further comprising:
    a separation member interposed between the first tooth member and the bracket to separate the first tooth row from the bracket in the orthogonal direction.

* * * * *